United States Patent [19]

Lee

[11] Patent Number: 5,560,637
[45] Date of Patent: Oct. 1, 1996

[54] SUSPENSION SYSTEM FOR VEHICLE

[75] Inventor: Unkoo Lee, Kyungki-do, Rep. of Korea

[73] Assignee: Hyundai Motor Company, Seoul, Rep. of Korea

[21] Appl. No.: 256,365

[22] PCT Filed: Dec. 2, 1993

[86] PCT No.: PCT/KR93/00107

§ 371 Date: Jul. 22, 1994

§ 102(e) Date: Jul. 22, 1994

[87] PCT Pub. No.: WO94/12359

PCT Pub. Date: Jun. 9, 1994

[30] Foreign Application Priority Data

Dec. 2, 1992 [KR] Rep. of Korea ................. 92-23099
Dec. 2, 1992 [KR] Rep. of Korea ................. 92-23103

[51] Int. Cl.$^6$ .................................................. B60G 3/06
[52] U.S. Cl. ........................... 280/661; 280/673; 280/690
[58] Field of Search .................................. 280/661, 673, 280/675, 690, 691, 692, 693, 697, 701

[56] References Cited

U.S. PATENT DOCUMENTS

| | | | |
|---|---|---|---|
| 3,161,419 | 12/1964 | Schaaf | 280/675 |
| 3,711,113 | 1/1973 | Stammreich | 280/675 |
| 4,842,297 | 6/1989 | Takahshi | 280/691 |
| 4,911,466 | 3/1990 | Blair | 280/668 |
| 5,375,075 | 12/1994 | Lee | 280/668 |

FOREIGN PATENT DOCUMENTS

| | | | |
|---|---|---|---|
| 3918359 | 12/1990 | Germany | 280/693 |
| 1592171 | 9/1990 | U.S.S.R. | 280/690 |

Primary Examiner—Karin L. Tyson
Attorney, Agent, or Firm—Birch, Stewart, Kolasch & Birch, LLP

[57] ABSTRACT

A suspension for a vehicle having a front side, a rear side, a left side, a right side and a longitudinal axis is disclosed and includes a wheel carrier for supporting a wheel, the wheel carrier including an upper end and a lower end. A strut assembly is provided including a shock absorber and a spring and having a lower end connected with the upper end of the wheel carrier and an upper end connected with a vehicle body. A lower control arm connects the lower end of the wheel carrier to the vehicle body for guiding up-and-down movement of the wheel. The lower control arm includes an inner vehicle body side end and an outer wheel side end. A camber control maintains a camber angle in a negative state by pushing the lower control arm outward at the connection of the outer end of the lower control arm with the lower end of the wheel carrier according to an ascending operation of the strut assembly when the wheel ascends over a normal section by a vibration applied from a road surface. Additionally, the camber control may control a camber and tread by pushing upper and lower control arms outward according to an ascending movement of the lower control arm in the case that upper and lower control arms are utilized in connection with the suspension system. The pushing of the upper and lower control arms outward is according to an ascending movement of the lower control arm cooperating when the wheel ascends by a vibration applied from a road surface.

13 Claims, 7 Drawing Sheets

SUSPENSION SYSTEM FOR VEHICLE

BACKGROUND OF THE INVENTION

1. Field of the Invention

This invention relates to a suspension system for a vehicle and, more particularly, to a suspension system which can enhance running safety, cornering safety and riding comfort by optimally controlling the change of a camber in accordance with a vehicle's travelling conditions.

2. Description of the Conventional Art

In general, a suspension system for a vehicle connects an axle shaft and a vehicle body to each other and absorbs an impact and vibration from a road surface to increase riding comfort and running safety. To absorb the impact from the road surface, a connection of upper and lower parts of the suspension system should be flexible, and to cape with driving and breaking forces applied to a wheel and centrifugal force in vehicle's turning, a connection in the horizontal direction of the suspension system should be durable.

The suspension system is structurally characterized as either an integral shaft suspension or an independent suspension. The suspension of this invention concerns an independent suspension. There are MacPherson strut type and Wishbone type suspension systems in the independent suspension.

Figure 9A:
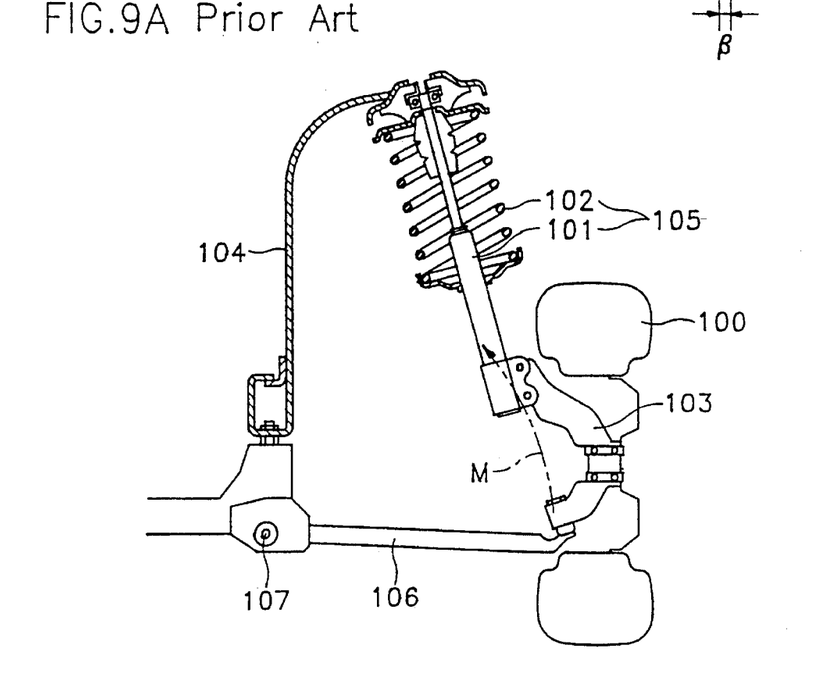
FIG. 9A is a view showing a conventional MacPherson type suspension.

The MacPherson strut type suspension system comprises a strut assembly 105, shock absorbing means, consisting of a shock absorber 101 and a spring 102 and having a lower end fixed to a wheel carrier 103 pivotally supporting a wheel 100 and an upper end supporting a vehicle body 104; and a lower control arm 106 connecting a lower side of the wheel carrier 103 to a lower side of the vehicle body 104, as shown in FIG. 9A.

The range of a wheel's up-and-down movement is determined by the lower control arm 106 during a wheel's up-and-down vibration. The vibration is absorbed by an elastic bushing of a vehicle body-side connecting portion. Impact from a road surface is absorbed by the shock absorber 101 and spring 102 of the strut assembly 105.

However, considering operation steps of the above described suspension system, when the wheel 100 vibrates upward and downward in accordance with traveling conditions, the wheel 100 moves upward and downward in a state where the length of the lower control arm 106 is predetermined. Thus, the wheel 100 moves upward and downward according to a tracing movement M which is formed by the length of lower control arm 106. A camber angle is changed according to the wheel's up-and-down movement and has a great effect on ride comfort, cornering safety, and running stability.

That is, since the wheel side end connecting portion of the lower arm 106 is designed to be disposed at a lower side of the wheel center, when the wheel moves along the tracing movement M, in a normal ascending section, the lower side of the wheel is pushed outward along a curvature of the tracing movement M, and the camber is changed to negative(−). However, in a section over the normal ascending section, the lower control arm 106 ascends and pulls the lower side of the wheel, whereby the camber is changed again to positive(+)(see broken line of FIG. 4A).

The change of the camber as described above is illustrated the broken line of FIG. 4A which will be described in the detailed description of the invention. Further a tread is changed as illustrated in the broken line of FIG. 4B by the change of the camber. Such changes of the camber and tread adversely effect the steering safety and the straight traveling safety of a vehicle.

Figure 9B:
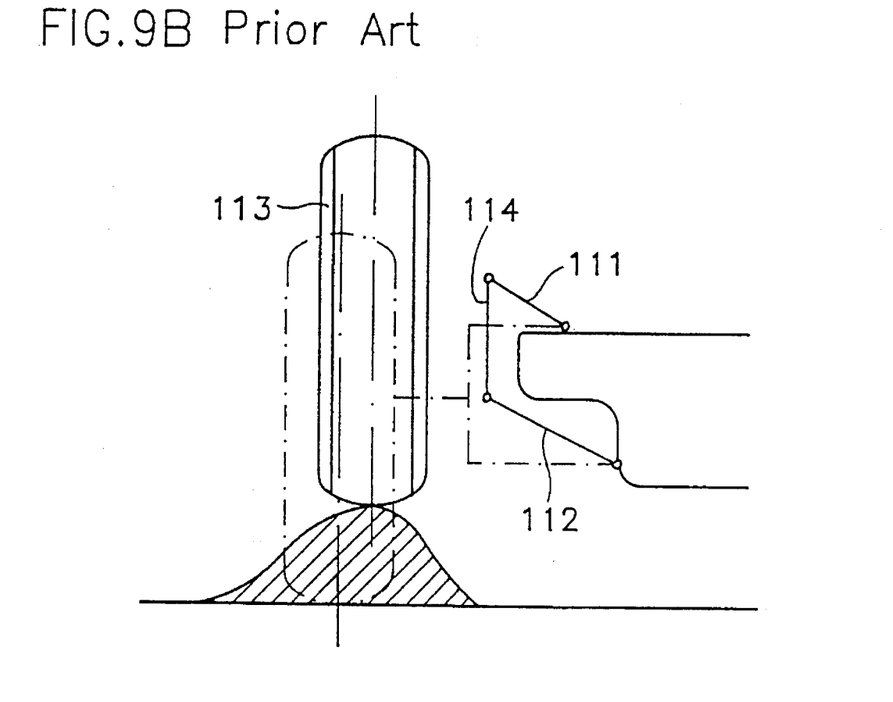
FIG. 9B is a view showing a conventional Wishbone type suspension.

The Wishbone type suspension system can be classified in two types, a short and long arm type(SLA) and a parallelogram type. The parallelogram type suspension system, as shown in FIG. 9B, is a type such that an upper control arm 111 is the same height as that of a lower control arm 112. This type has a problem that when the wheel 113 moves upward and downward, since each point connected with a wheel carrier 114 of the upper and lower control arms moves in parallel to each other as shown in a broken line, the camber is not changed but the tread is severely changed.

Figure 9C:
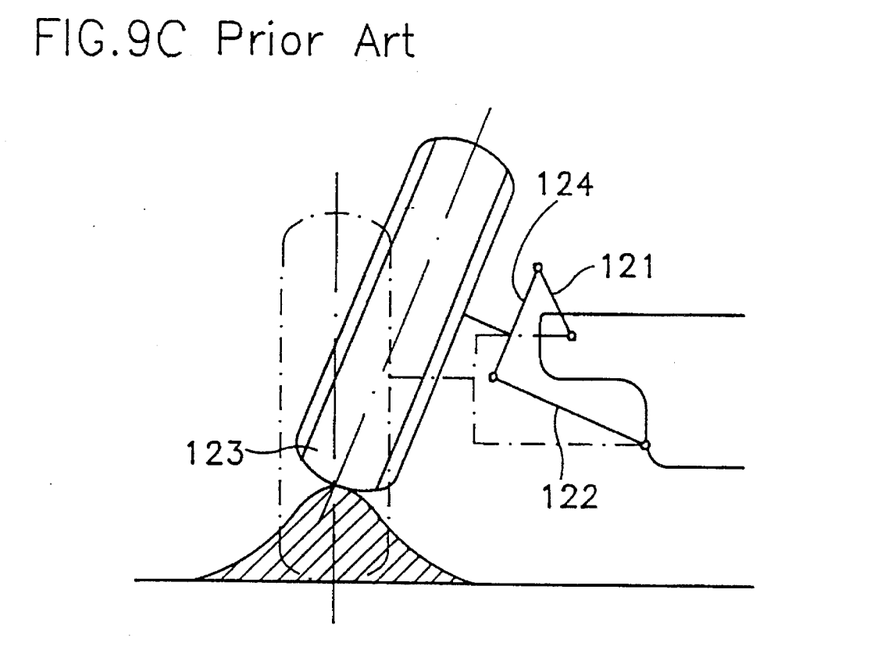
FIG. 9C is a view showing another conventional Wishbone type suspension.

Further, the short and long arms type suspension system, as shown in FIG. 9C, is a type that a lower control arm 122 is longer than an upper control arm 121. This type has a problem that when the wheel 123 moves upward and downward, since the upper control arm 121 has a small curvature tracing movement and the lower control arm 122 has a large curvature tracing movement, the tread is not changed but the camber is severely changed.

SUMMARY OF THE INVENTION

Accordingly, the present invention has been made in an effort to solve the above-described problems.

It is an object of the present invention to provide a suspension system which can maintain a camber in a negative(−) state in a bump section over a normal ascending section.

It is another object of the present invention to provide a suspension system which can improve cornering safety and traveling safety.

To achieve the above objects, the present invention provides a suspension system for a vehicle comprising: a wheel carrier for supporting a wheel; a strut assembly including a shock absorber and a spring and having a lower end connected with the wheel carrier and an upper end connected with a vehicle body; a lower control arm connecting a lower side of the wheel carrier to the vehicle body for guiding an up-and-down movement of the wheel; and camber control means for maturing a camber angle in a negative(−) state by pushing the lower control arm outward according to an ascending operation of the strut assembly when the wheel is ascended over a normal section by a vibration applied from a road surface.

The camber control means comprises: a rotating arm including a hinge portion, a horizontal arm projecting outward from the hinge portion, and a vertical arm projecting downward from the hinge portion, the high portion being fixed on the vehicle body above the vehicle body-side connecting portion of the lower control arm; a connecting rod including an upper end pivotally connected with a front end of the horizontal arm and lower end pivotally connected with a bracket formed on a lower-inner side of the strut assembly; and an eccentric rubber bush inserted into a vehicle body-side connecting portion of the lower control arm.

Further, the present invention provides a suspension system for a vehicle having a front side, a rear side, a left side, a right side and a longitudinal axis, the rear suspension system comprising: a wheel carrier for supporting a wheel; upper and lower control arms connecting the wheel carrier to a vehicle body for guiding an up-and-down movement of the wheel; and camber control means for controlling a camber and tread by pushing the upper and lower control arms outward according to an ascending movement of the lower control arm cooperating when the wheel is ascended by a vibration applied from a road surface.

The camber control means comprises: two rotating arms respectively including a hinge portion fixed on the vehicle body above the vehicle body side connecting portion of the each upper and lower control arms, a horizontal arm projecting outward from the hinge portion, and a vertical arm projecting downward from the hinge portion; a connecting rod having upper and lower ends pivotally connected with each front end of the horizontal arms; the lower end being pivotally connected with the lower control arm; and an eccentric rubber bush inserted into each vehicle body-side connecting portion of the upper and lower control arms.

BRIEF DESCRIPTION OF THE DRAWINGS

Further objects and other advantages of the invention will become apparent from the following description in conjunction with the attached drawings, in which.

DETAILED DESCRIPTION OF THE INVENTION

Figure 1:
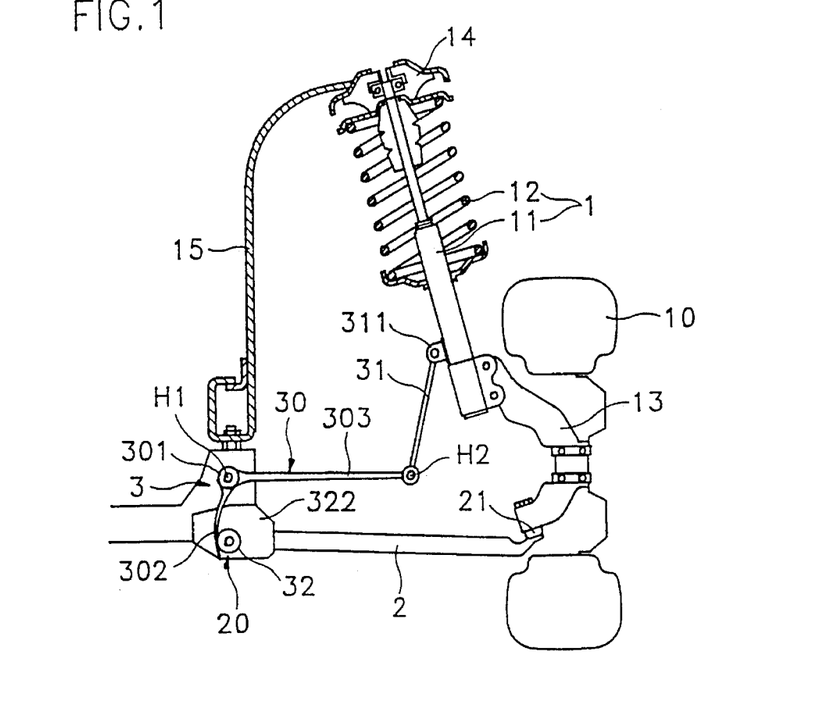
FIG. 1 is a view of a suspension system according to a first preferred embodiment of the present invention.
Figure 2:
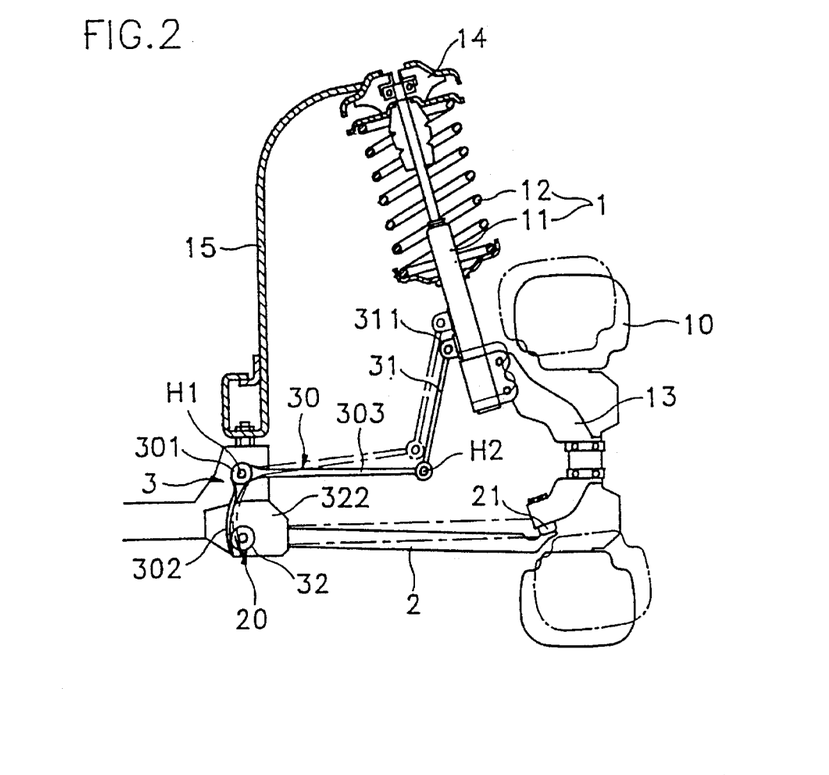
FIG. 2 is a view showing an operating state of the suspension system shown in FIG. 1.
Figure 3A:
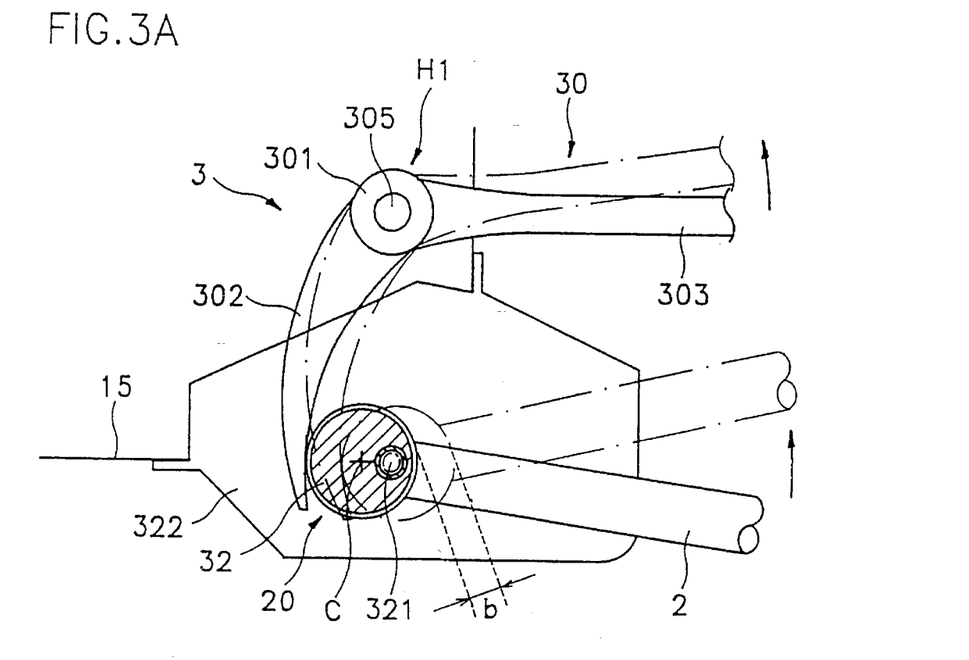
FIG. 3A is a partial view showing an operating state of the suspension system shown in FIG. 1 when a wheel ascends.
Figure 3B:
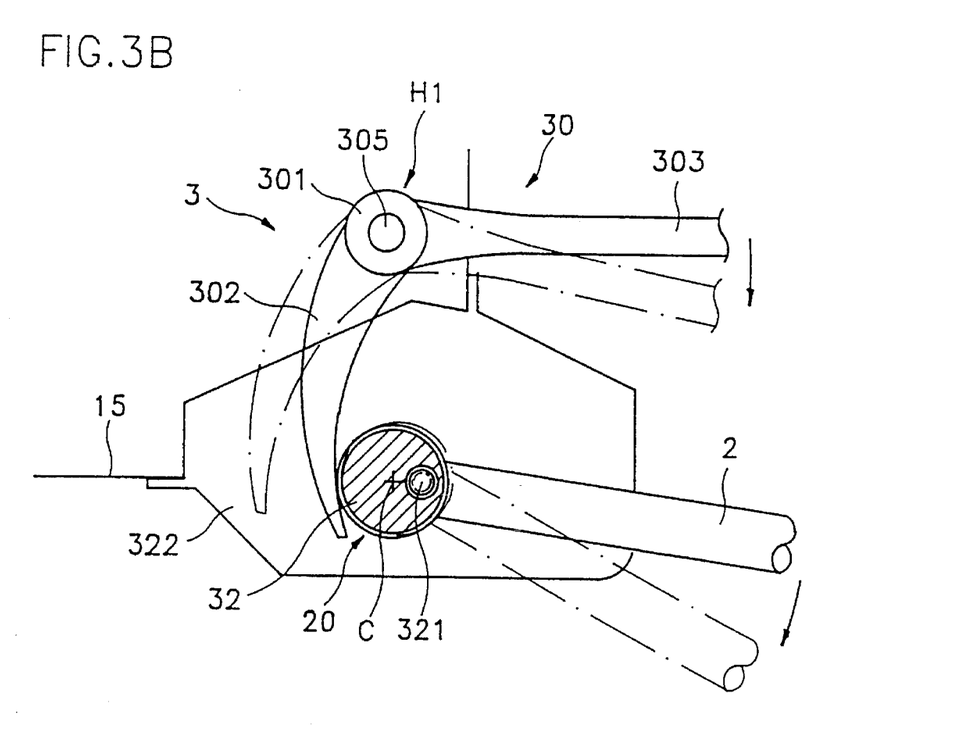
FIG. 3B is a partial view showing an operational state of the suspension system shown in FIG. 1 when a wheel descends.

FIGS. 1, 2 and 3 are views of a suspension according to a first embodiment of the present invention, in which the suspension includes a strut assembly 1, absorbing means, consisting of a shock absorber 11 and a spring 12; a lower control arm 2 for guiding an up-and-down movement of a wheel 10; and a camber control member 3 having a rotating arm 30 and a connecting rod 31.

The strut assembly 1 is integrally connected at its lower end with a wheel carrier 13 rotatably supporting the wheel 10, and at its upper end with a vehicle body 15 by means of an insulator 14.

The lower control arm 2 connecting the lower side of the vehicle body 15 to the lower side of the wheel carrier 13 to move the wheel 10 upward and downward with respect to the vehicle body 15 has connecting portions 20 and 21 on its both ends.

The connecting portions 20 and 21 connect with the vehicle body 15 and wheel carrier 13 respectively. The connecting portions 20 and 21 may use a rubber bush or a ball joint, however in the present invention, the vehicle body-side connecting portion 20 is using the rubber bush, and wheel-side connecting portion 21 is using the ball joint.

As the above described suspension system is included in a MacPherson type suspension, when the wheel ascends over a normal ascending section by a vibration applied from a road surface, the camber control member 3 pushes the lower control arm 2 outward according to an ascending operation of the strut assembly 1 which ascends during a wheel's ascending so that a camber angle is maintained in a negative(−) state.

In more detail, the camber control member 3 includes a rotating arm 30 having a hinge portion 301, a horizontal arm 303 projecting outward from the hinge portion 301, and a vertical arm 302 projecting downward from the hinge portion 301; the connecting rod 31 connected at its lower end with the front end of the horizontal arm 303 and at its upper end pivotally with a bracket 311 formed at an inner-lower side of the strut assembly; and an eccentric rubber bush 32 inserted into the vehicle body-side connecting portion 20 of the lower control arm 2.

The hinge portion 301 is formed above the connecting portion 20 with a predetermined interval and fixed by a hinge pin 305 on the vehicle body thereby forming a fixed hinge point H1.

A moving hinge point H2 is formed at the connecting portion of the front end of the horizontal arm 303 and the lower end of the connecting rod 31.

The vertical arm having a predetermined curvature is formed with an arc-shape with its middle portion curved to the vehicle body side. The lower end-outside of the vertical arm contacts the front end of the connecting portion 20 of the lower control arm 2.

According to the above-described suspension system, when the strut assembly 1 ascends in accordance with a wheel's ascending, the connecting rod 31 is also ascended, and at this point, the front end of the horizontal arm 303 connected with the connecting rod 31 ascends counterclockwise, and at the same time, the rotating arm 30 is rotated counterclockwise, such that the vertical arm 302 pushes the vehicle body-side connecting portion 20 outward whereby the lower control arm 2 is pushed outward.

As described above, to push the lower control arms outward by the ascending operation of the strut assembly, the eccentric rubber bush 32, which can control an up-and-down movement of the lower control arm 2 with a suitable spring characteristic and receive the lower control arm being pushed, should be inserted into the vehicle body-side connecting portion 20.

That is, as shown in FIGS. 3A and 3B, the rubber bush 32 eccentrically forms an axle hole 321. The rubber bush 32 is connected with a fixed member 322 through the axle hole 321 by a bolt such that the vehicle body-side connecting portion 20 of the lower control arm 2 is connected to the vehicle body 15.

Further, the rubber bush 32 is disposed such that the axle hole 321 lies on a line which connects a center point C of the rubber bush 32 to an axle line of the lower control arm 2.

When the wheel 10 moves upward and downward in the normal ascending section in accordance with a condition of the road surface, the lower control arm 2 moves upward and downward on the basis of vehicle body-side connecting portion 20 in the same manner with the conventional suspension system, and when the wheel ascends over the normal ascending section, the camber angle is controlled by the control member 3.

That is, as shown in FIG. 2, when the strut assembly 1 ascends in accordance with a wheel's ascending, the connecting rod 31 also ascends, and at this point, the front end of the horizontal arm 30 connected with the connecting rod 31 is ascended counterclockwise, and at the same time, as shown in a broken line of FIG. 3A, the rotating arm 30 is rotated counterclockwise such that the vertical arm 30 pushes the vehicle body-side connecting portion 20 outward when the wheel ascends over the normal ascending section whereby the lower control arm 2 is pushed outward.

At this point, since the eccentric rubber bush 32 is inserted into the vehicle body-side connecting portion 20, a large scale rubber portion, vehicle body side of the rubber bush 32, formed by the eccentric axle hole 321 is compressed the pushing force of the rotating arm 30, and at the same time, causes the lower control arm 2 to be pushed. Thus, the lower control arm 2, as shown in a broken line of FIG. 3A, is rotated upward, and at the same time moves outward by "b."

As described above, when the lower control arm 2 moves outward by "b," the lower side of the wheel 10, which is connected with the wheel side connecting portions of the lower control arm 2, is pushed outward, such that the camber of the wheel 10 is increased to negative(−).

Figure 4A:
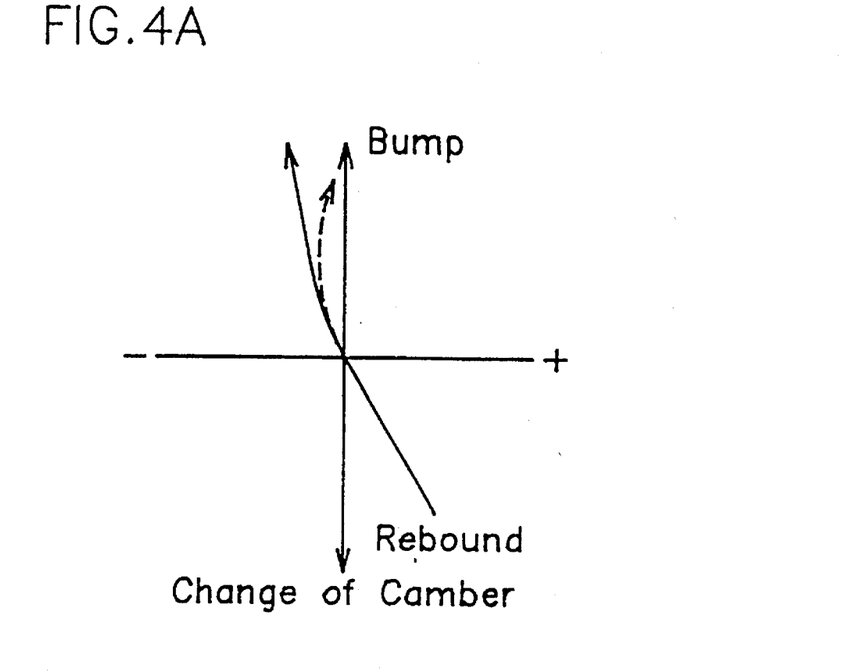
FIG. 4A is a graph showing a camber change of a suspension system according to FIG. 1.

The change of the camber according to the suspension of the present invention is illustrated in a solid line of FIG. 4A. Before the wheel ascends over the predetermined angle, that is, in the normal ascending section, the change of the camber is the same with that of the conventional suspension illustrated in a broken line of FIG. 4A. However, when the wheel ascends over the normal ascending section, the camber is changed to a negative(−) condition and the ground camber becomes zero(0) in a vehicle's cornering by the camber control member 3, whereby the cornering ability is improved.

Figure 4B:
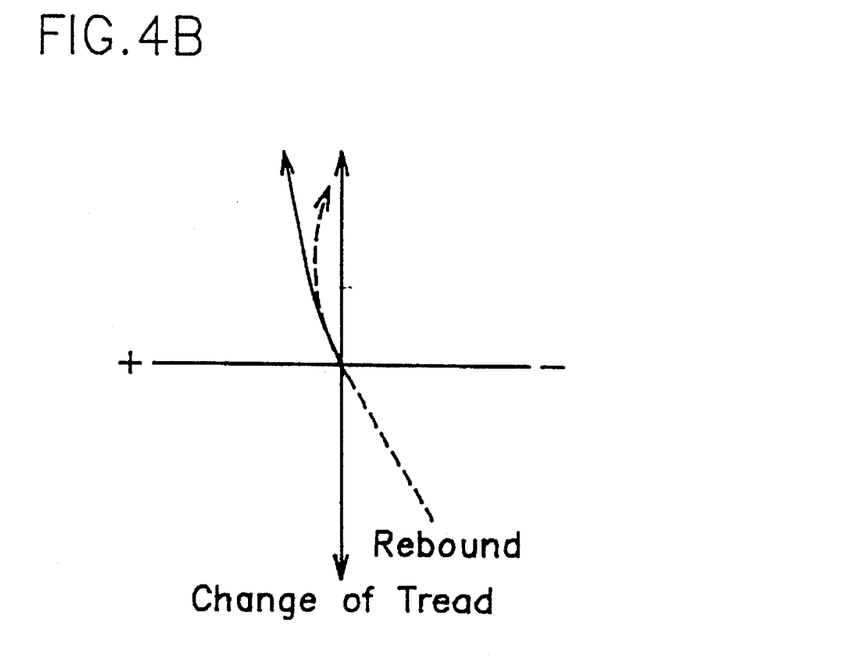
FIG. 4B is a graph showing a tread change of a suspension system according to FIG. 1.

According to the above described camber change, as described in solid line of FIG. 4B, the change of tread is increased, such that the cornering ability is improved.

The amount of push applied to the lower control arm 2 is determined by the length difference of the horizontal and vertical arms 303 and 302 of the rotating arm 30. Thus, when designing the suspension, a length ratio of the horizontal and vertical arm may be changed according to a kind of a vehicle applied so as to establish the optimal camber and tread changes.

Accordingly, since the camber and tread changes are simply established, the free layout degree can be increased.

Further, when the wheel 10 descends, the strut assembly 1 and the lower control arm 2 are descended along with the wheel, and at this point, the connecting rod is pushed to the lower side by the strut assembly 1.

The front end of the horizontal arm 303 of the rotating arm 30 is then pushed to the lower side by the connecting rod 31. The rotating arm 30 is rotated clockwise as shown in FIG. 3B, such that the vertical arm 302 becomes far away from the vehicle body-side connecting portion 20 whereby the camber control member does not have an effect on the camber control.

FIGS. 5 through 8 are views showing a suspension system of a second preferred embodiment of the present invention, in which the suspension system includes a wheel carrier 4 rotatably supporting a wheel 41; upper and lower control arms 5 and 6, respectively connecting the wheel carrier to the vehicle body 15.

Figure 5:
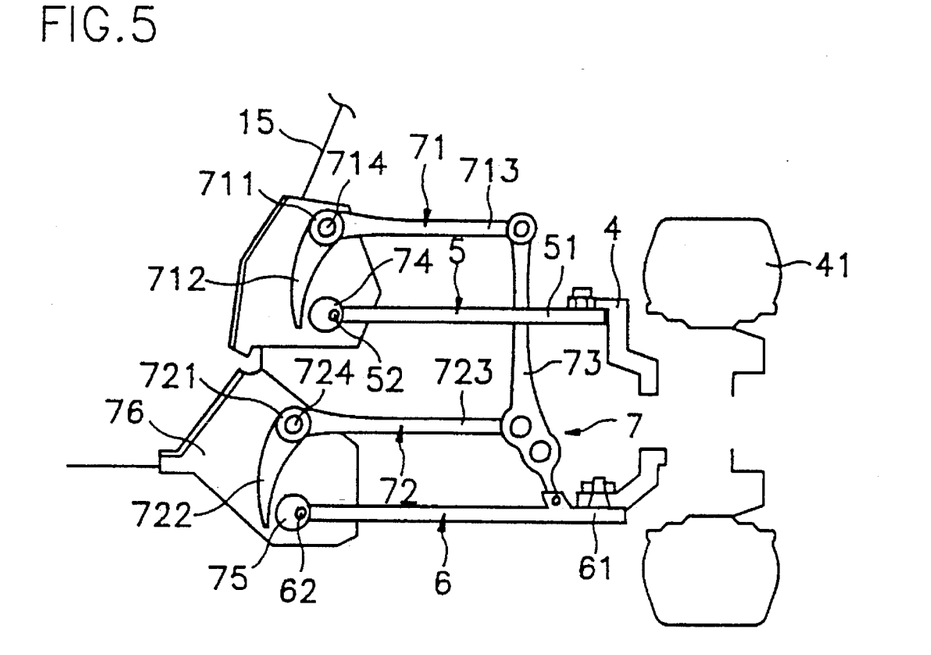
FIG. 5 is a view of a suspension system according to a second preferred embodiment of the present invention.

The lower control arm 6 has connecting portions 61 and 62 on opposing both ends. The upper control arm 5 has connecting portions 52 and 51 on opposing ends. The wheel-side connecting portions 51 and 61 are using a ball joint connecting method and the vehicle body connecting portions 52 and 62 are using a rubber bushing connecting method.

A length of the upper control arm 5 is less than that of the lower control arm 6. The upper control arm 5 is spaced from the lower control arm 6.

Accordingly, similar to the conventional SLA-type suspension system, when the wheel ascends, since the upper control arm 5 moves along a tracing movement of a relatively small circular arc and the lower control arm 6 moves along a tracing movement of a relatively large circular arc, the camber changes.

As a Wishbone-type suspension system, the suspension system of this embodiment further includes a camber control member 7 which can control a camber and tread by pushing the upper and lower control arms 5 and 6 outward according to the ascending movement of the lower control arm 6 cooperated with the ascending movement of the wheel 41.

The camber control member 7 includes an upper rotating arm 71 having a hinge portion 711, a vertical arm 712 projecting from the hinge portion downward, and a horizontal arm 713 projecting from the hinge portion outward; a lower rotating arm 72 having a hinge portion 721, a vertical arm 722 projecting from the hinge portion 721 downward, a horizontal arm 723 projecting from the hinge portion 721 outward; a connecting rod 73 connecting the front ends of the horizontal arms 713 and 723 to each other and having a lower end connected to an upper side of the lower control arm 6; and eccentric rubber bushes 74 and 75 respectively inserted into vehicle body-side connecting portions 52 and 62 of the upper and lower control arms 5 and 6.

The hinge portions 711 and 721 are respectively formed above the connecting portions 52 and 62 with a predetermined interval and fixed by a hinge pin 714 and 724 respectively thereby forming fixed hinge points H3 and H4.

Moving hinge points are respectively formed at the connecting portions of the front ends of each horizontal arm 713 and 723 and the lower and upper ends of the connecting rod 73.

Each vertical arm having a predetermined curvature is formed in an arc-shape with its middle portion curved to the vehicle body side, the lower end-outside of each vertical arm is disposed with a predetermined space from the front end of the connecting portion 62 of the lower control arm 6.

Figure 6:
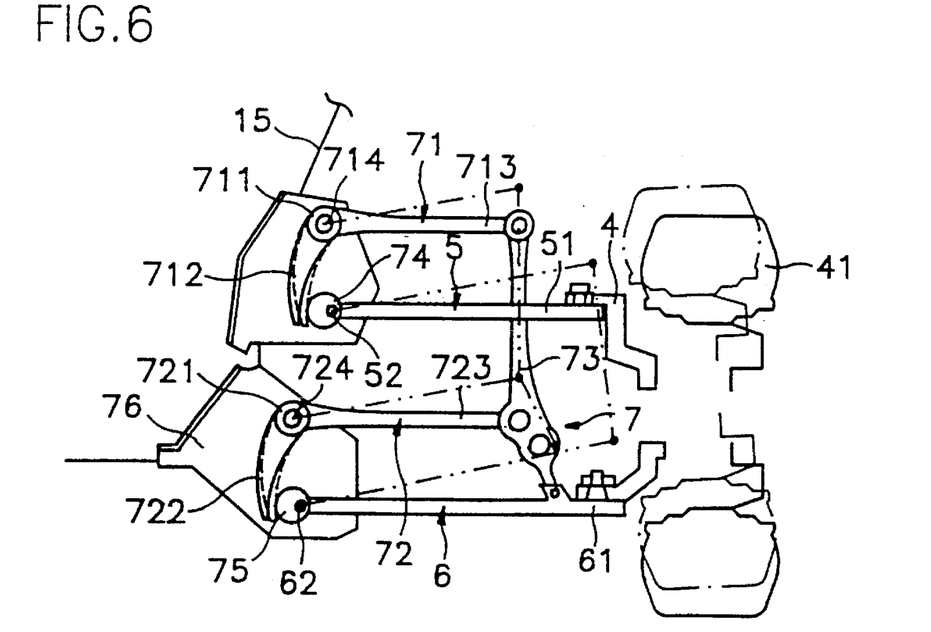
FIG. 6 is a view showing an operating state of the suspension system shown in FIG. 5.

According to the above-described suspension system, when the lower control arm 6 ascends in accordance with a wheel's ascending, the connecting rod 73 also ascends, and at this point, the front end of each horizontal arm 713 and 723 connected with the connecting rod 73 ascends counterclockwise, and at the same time, each rotating arm 71 and 72 is rotated counterclockwise, such that each vertical arm 712 and 722 pushes each vehicle body-side connecting portion 52 and 62 outward whereby each of the upper and lower control arm 5 and 6 is pushed outward.

As described above, to push the upper and lower control arms 5 and 6 outward by the ascending operation of the lower control arm 6, the eccentric rubber bushes 74 and 75, which can control upward-and-downward movement of the upper and lower control arms with a suitable spring characteristic and receive the pushed force of the lower control arm in a normal upward-and-downward vibration section, should be inserted into each vehicle body side connecting portion 52 and 62.

Figure 7A:
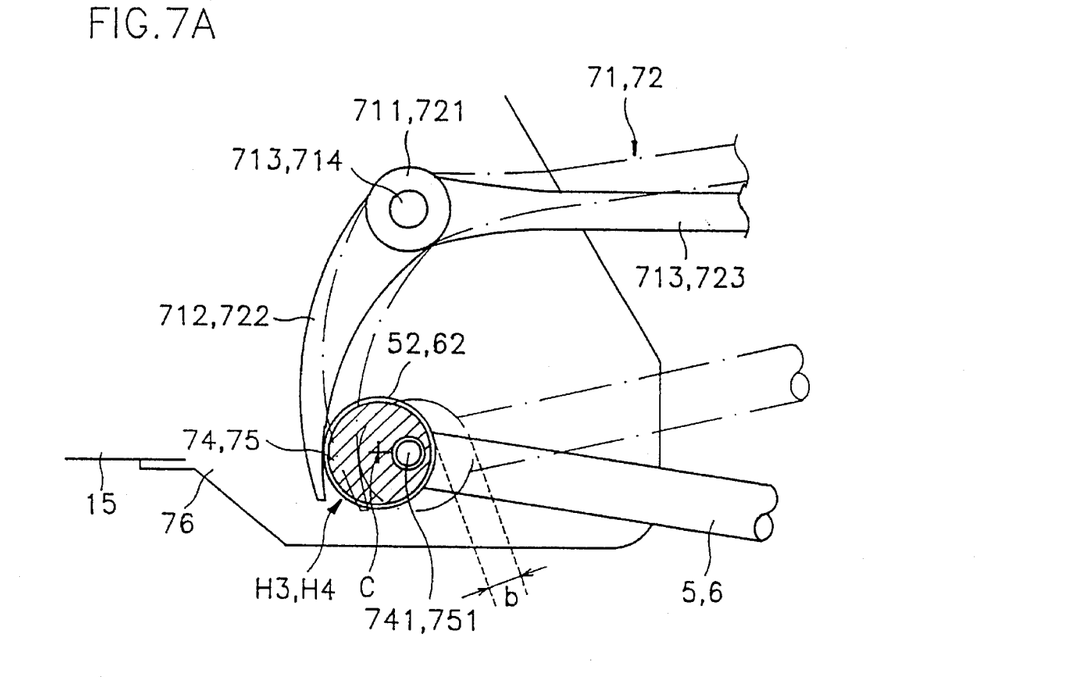
FIG. 7A is a partial view showing an operating state of the suspension system shown in FIG. 5 when a wheel ascends.
Figure 7B:
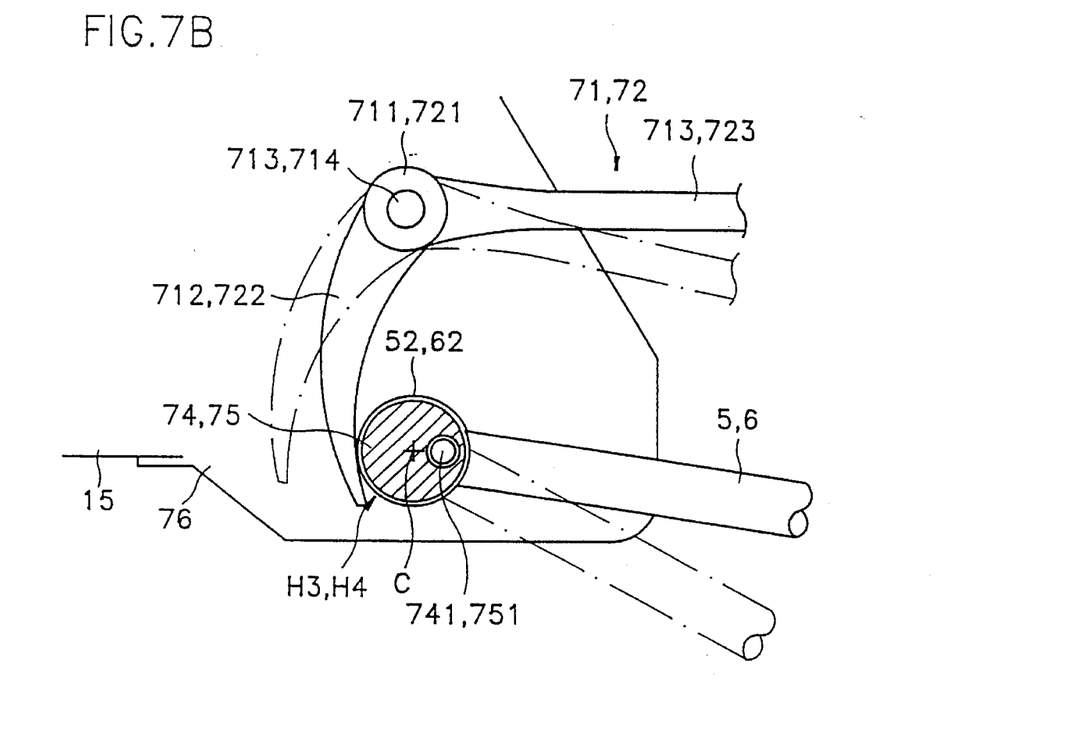
FIG. 7B is a partial view showing an operational state of the suspension system shown in FIG. 5 when a wheel descends.

That is, as shown in FIGS. 7A and 7B, the rubber bushes 74 and 75 eccentrically form axle holes 741 and 751, respectively. The rubber bushes 74 and 75 are respectively connected with fixed members 76 through each axle hole 741 and 751 by a bolt such that each vehicle body-side connecting portion 52 and 62 of the upper and lower control arms 5 and 6 is connected to the vehicle body 15.

Further, the rubber bushes 74 and 75 are disposed such that the axle holes 741 and 751 lie on lines which connect center points C of each rubber bush 74 and 75 to axle lines of the upper and lower control arms 5 and 6.

In the suspension system, when the wheel 41 moves upward and downward in the normal vibration section in accordance with a condition of a road surface, each of the upper and lower control arm 5 and 6 move upward and downward on the basis of each vehicle body-side connecting portion 52 and 62 in the same manner with the conventional suspension system, and when the wheel 41 is ascended the normal section, the camber angle is controlled by the camber control member 7.

That is, as shown in FIG. 6, when the upper and lower control arms 5 and 6 ascend in accordance with a wheel's ascending movement, the connecting rod 73 is also ascended, and at this point, the front ends of the horizontal arms 713 and 723 respectively connected with the connecting rod 73 ascend counterclockwise and, at the same time, as shown in a broken line of FIG. 7A, each rotating arm 71 and 72 is rotated counterclockwise, such that the vertical arms 712 and 722 respectively push the vehicle body-side connecting portions 52 and 62 outward when the wheel ascends over the normal ascending section whereby the upper and lower control arms 5 and 6 are pushed outward.

At this point, since the eccentric rubber bushes 74 and 75 are respectively inserted into the vehicle body-side connecting portion 52 and 62, large scale rubber portions, vehicle body sides of rubber bushes 74 and 75, formed by the eccentric axle hole 741 and 751 are respectively compressed by pushing forces of the rotating arms 71 and 72, and at the same time, ensure the upper and lower control arms 5 and 6 to be pushed outward. Thus the upper and lower control arms 5 and 6, as shown in a broken line of FIG. 7A, are rotated upward, and at the same time, moved outward by "b."

As described above, when the lower control arm 6 moves outward by "b," the lower side of the wheel 41, which is connected with the wheel-side connecting portion of the lower control arm 6, is pushed outward, such that the upper control 5 arm prevents the camber from being excessively changed to being negative(–) and the lower control arm 6 prevents the change of tread from being large.

Figure 8:
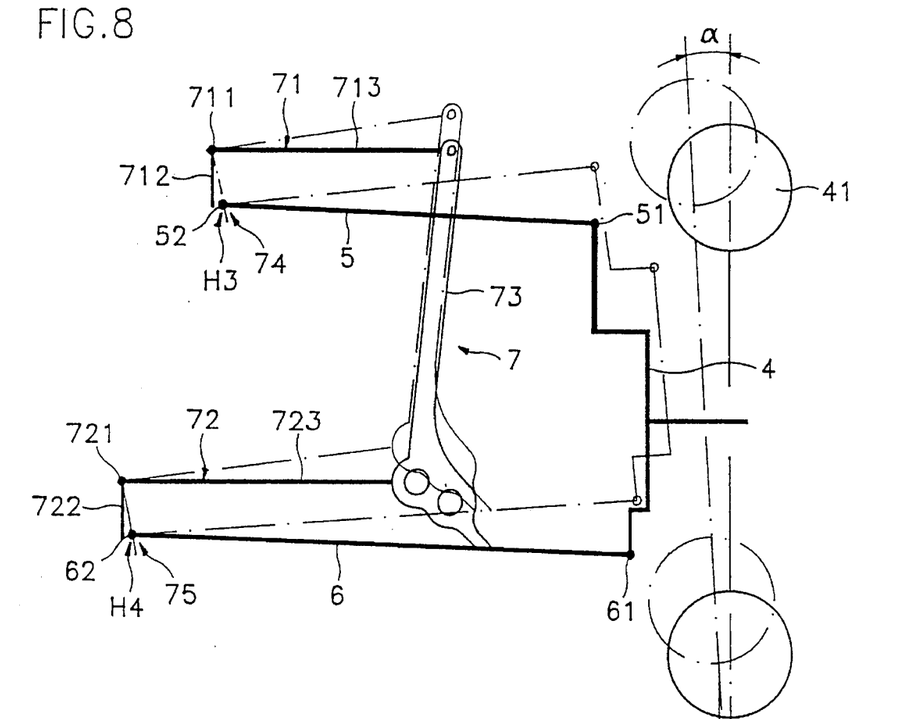
FIG. 8 is the view showing an effectiveness of a suspension system according to FIG. 5.

Accordingly, as shown in FIG. 8, since the changes of the camber α and tread β occur in a small scale, riding comfort and handling safety are improved by increasing straight-traveling safety and cornering safety.

The amounts of the upper and lower control arms 5 and 6 being pushed are determined by the length difference of the horizontal arms 713 and 723. Thus, when designing the suspension, the length ratio of the horizontal and vertical arms may be changed according to a vehicle applied so as to establish the optimal camber and tread changes.

Accordingly, since the camber and tread changes are simply established, the free layout degree can be increased.

Further, when the wheel 41 descends, the lower control arm 6 descends along the wheel and, at this point, the connecting rod also 73 descends while pushing the front end of the horizontal arms 713 and 723 of the rotating arms 71 and 72 to the lower side. The rotating arms 71 and 72 are rotated clockwise as shown in a broken line of FIG. 7B.

Thus, the vertical arms 712 and 722 become far away from the vehicle side-connecting portions 52 and 62 of the upper and lower control arms 5 and 6 respectively, whereby the camber control member 7 does not act on camber control.

As described above, the present invention provides suspension systems for vehicles which can enhance running safety, cornering safety and ride comfort by optimally controlling the change of a camber in accordance with a vehicle's traveling conditions.

Although preferred embodiments of the present invention have been described in detail hereinabove, it should be clearly understood that many variations and/or modification of the basic inventive features herein taught which may appear to those skilled in the pertinent art will still fall within the spirit and scope of the present invention, as defined in the appended claims.

What is claimed is:

1. A suspension system for a vehicle, the vehicle having a front side, a rear side, a left side, a right side and a longitudinal axis, the suspension system comprising:

a wheel carrier for supporting a wheel, said wheel carrier including an upper end and a lower end;

a strut assembly including a shock absorber and a spring and having a lower end connected with the upper end of said wheel carrier and an upper end connected with a vehicle body;

a lower control arm connecting the lower end of the wheel carrier to the vehicle body for guiding up-and-down movement of the wheel, said lower control arm including an inner vehicle body side end and an outer wheel side end; and camber control means for maintaining a camber angle in a negative (–) state by pushing the lower control arm outward at the connection of the outer end of said lower control arm with the lower end of said wheel carrier according to an ascending operation of the strut assembly when the wheel ascends over a normal section by a vibration applied from a road surface.

2. The suspension system of claim 1, wherein said camber control means comprises:

a rotating arm including a hinge portion, a horizontal arm projecting outward from the hinge portion, and a vertical arm projecting downward from the hinge portion, the hinge portion being fixed on the vehicle body above the vehicle body-side connecting portion of the lower control arm;

a connecting rod including a lower end pivotally connected with a front end of the horizontal arm and an upper end pivotally connected with a bracket formed on a lower-inner side of the strut assembly; and an eccentric rubber bush inserted into the vehicle body side connection portion of the lower control arm.

3. The suspension system of claim 2, wherein the vertical arm is formed in an arc-shape with a predetermined curvature, a middle portion of the vertical arm being curved to the vehicle body side.

4. The suspension system of claim 2, wherein the eccentric rubber bush eccentrically forms an axle hole for controlling the up-and-down movement of the lower control arm with a pertinent spring characteristic in a normal vibration section of the wheel and receiving a pushing force when the lower control arm is pushed outward.

5. The suspension system of claim 4, wherein the rubber bushing is disposed such that the axle hole lies on a line which connects a center point of the rubber bush to an axle line of the lower control arm.

6. A suspension system for a vehicle, the vehicle having a front side, a rear side, a left side, a right side and a longitudinal axis, the suspension system comprising:

a wheel carrier for supporting a wheel, said wheel carrier including an upper end and a lower end;

upper and lower control arms connecting the upper and lower ends of said wheel carrier, respectively, to a vehicle body for guiding up-and-down movement of the wheel, said upper and lower control arms each including an inner vehicle body side end and an outer wheel side end; and camber control means for controlling a camber and tread by pushing the upper and lower control arms outward according to an ascending movement of the lower control arm cooperating when the wheel ascends by vibration applied from a road surface, wherein said camber control means includes two rotating arms, each rotating arm including a hinge portion fixed on the vehicle body above the vehicle body-side connecting portion of each upper and lower control arm, a horizontal arm projecting outward from the hinge portion, and a vertical arm projecting downward from the hinge portion;

a connecting rod having upper and lower ends pivotally connected with each outer end of the horizontal arms, the lower end being pivotally connected with the lower control arm; and an eccentric rubber bush inserted into each vehicle body-side connecting portion of the upper and lower control arms.

7. The suspension system of claim 6, wherein each vertical arm is formed in an arc-shape with a predetermined curvature, a middle portion of the vertical arm being curved to the vehicle body side.

8. The suspension system of claim 6, wherein the eccentric rubber bush eccentrically forms an axle hole for controlling the up-and-down movement of the upper and lower control arms with a pertinent spring characteristic in a normal vibration section of the wheel and receiving pushing force when the lower control arm is pushed to the outside.

9. The suspension system of claim 8, wherein each rubber bush is disposed such that the axle hole lies on a line which connects a center point of the rubber bush to an axle line of each upper and lower control arm.

10. A suspension system for a vehicle, the vehicle having a front side, a rear side, a left side, a right side and a longitudinal axis, the suspension system comprising:

a wheel carrier for supporting a wheel, said wheel carrier including an upper end and a lower end;

a strut assembly including a shock absorber and a spring and having a lower end connected with the upper end of said wheel carrier and an upper end connected with a vehicle body;

a lower control arm connecting the lower end of the wheel carrier to the vehicle body for guiding up-and-down movement of the wheel, said lower control arm including an inner vehicle body side end and an outer wheel side end; and camber control means for maintaining a camber angle in a negative (−) state by pushing the lower control arm outward at the connection of the outer end of said lower control arm with the lower end of said wheel carrier according to an ascending operation of the strut assembly when the wheel ascends over a normal section by a vibration applied from a road surface, wherein said camber control means includes:

a rotating arm including a hinge portion, a horizontal arm projecting outward from the hinge portion, and a vertical arm projecting downward from the hinge portion, the hinge portion being fixed on the vehicle body above the vehicle body-side connecting portion of the lower control arm, a connecting rod including a lower end pivotally connected with a front end of the horizontal arm and an upper end pivotally connected with a bracket formed on a lower-inner side of the strut assembly, and an eccentric rubber bush inserted into the vehicle body side connection portion of the lower control arm.

11. The suspension system of claim 10, wherein the vertical arm is formed in an arc-shape with a predetermined curvature, a middle portion of the vertical arm being curved to the vehicle body side.

12. The suspension system of claim 10, wherein the eccentric rubber bush eccentrically forms an axle hole for controlling the up-and-down movement of the lower control arm with a pertinent spring characteristic in a normal vibration section of the wheel and receiving a pushing force when the lower control arm is pushed outward.

13. The suspension system of claim 12, wherein the rubber bushing is disposed such that the axle hole lies on a line which connects a center point of the rubber bush to an axle line of the lower control arm.

* * * * *